United States Patent
Shiojima (10) Patent No.: US 6,639,386 B2
(45) Date of Patent: Oct. 28, 2003

(54) RECHARGEABLE BATTERY DEVICE EQUIPPED WITH LIFE DETERMINATION FUNCTION

(75) Inventor: Nobuo Shiojima, Tokyo (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 10/284,101

(22) Filed: Oct. 31, 2002

(65) Prior Publication Data

US 2003/0085690 A1 May 8, 2003

(30) Foreign Application Priority Data

Nov. 2, 2001 (JP) .................................... 2001-338072
Dec. 5, 2001 (JP) .................................... 2001-371752

(51) Int. Cl.[7] ............................................. H02J 7/00
(52) U.S. Cl. ....................................... 320/132; 320/130
(58) Field of Search ............................. 320/132, 130, 320/134, 136, 137, 144, 149; 429/92, 96

(56) References Cited

U.S. PATENT DOCUMENTS 5,408,170 A * 4/1995 Umetsu et al. ............... 320/39
5,652,069 A * 7/1997 Sakai et al. ................... 429/92
6,127,810 A * 10/2000 Sato et al. .................. 320/148

* cited by examiner

Primary Examiner—Lawrence Luk
(74) Attorney, Agent, or Firm—Armstrong, Westerman & Hattori, LLP (57) ABSTRACT

A rechargeable battery device includes battery voltage detection means which detects the terminal voltage of a rechargeable battery comprising a nickel hydride metal battery and switching means which switches on and off the charging current of the rechargeable battery continuously or intermittently. A value corresponding to the internal resistance R of the rechargeable battery is determined from the battery voltage Von immediately before the charging current is switched off and the open battery voltage Voff after the charging current is switched off. The value Z(int) corresponding to the early-stage internal resistance R of the rechargeable battery and the value Z(now) corresponding to the latest internal resistance R of the rechargeable battery are compared to determine the operation life of the rechargeable battery.

11 Claims, 7 Drawing Sheets

RECHARGEABLE BATTERY DEVICE EQUIPPED WITH LIFE DETERMINATION FUNCTION

BACKGROUND OF THE INVENTION

1. Field of the Invention

The present invention relates to a rechargeable battery device provided with a function that can accurately determine the operation life of a rechargeable battery such as a nickel hydride metal (Ni-MH) battery which is repeatedly recharged and used as a power source of an electronic device.

2. Description of the Prior Art

In recent years, repeatedly rechargeable batteries have come into widespread use as power sources of electronic devices. However, it cannot be denied that the battery performance of the rechargeable battery deteriorates after repeated charging and discharging or due to secular changes or other reasons. In applications where the rechargeable battery is used as a backup power source of utility power, as seen in an interruptible power supply for a server of a network system, it is important to determine accurately the battery performance and by extension the battery life.

One conventional method of evaluating the performance of a rechargeable battery (degree of cycle deterioration) disclosed in Japanese Unexamined Patent Publication No. Hei 8-228440 uses a discharging load connected via a switch in parallel with the rechargeable battery and determines the battery life by obtaining the internal resistance of the rechargeable battery from a terminal voltage measured while switched off (open) and a terminal voltage measured while switched on (close). This method requires a switch and a load for determining the operation life and requires the discharging of the rechargeable battery, disadvantageously.

Another method disclosed in Japanese Unexamined Patent Publication No. Hei 11-329512 judges the degree of performance deterioration by measuring the constant-current charging time required to bring the rechargeable battery into full charge and by comparing the measured time with the charging time measured when the battery was new. Actually, it is difficult to maintain the conditions for charging the rechargeable battery constant, and the charging time may depend on the temperature of the battery, for instance.

The inventors of the present invention suggested a method of determining the operation life of a rechargeable battery on the basis of the internal resistance of the battery in the full-charge condition (Japanese Patent Application No. 2000-196566). When the rechargeable battery is fully charged, the oxygen gas generated in the battery is absorbed by the negative-pole member, causing a sudden increase in the battery temperature. As the battery temperature increases, the internal resistance of the rechargeable battery varies. Accordingly, to determine the battery life accurately from the internal resistance of the rechargeable battery, as described above, the internal resistance must be compensated for changes in battery temperature, for instance.

SUMMARY OF THE INVENTION

An object of the present invention is to provide a rechargeable battery device of a simplified structure which can solve the problems described above and can accurately determine the operation life of the rechargeable battery at stable battery temperatures, without useless consumption of the charged power of the rechargeable battery.

An embodiment of the rechargeable battery device configured to attain the object of the present invention described above comprises battery voltage detection means which detects the terminal voltage of the rechargeable battery comprising a nickel hydride metal battery, for instance, and switching means which switches on and off the charging current continuously or intermittently during the charging of the rechargeable battery. The rechargeable battery device particularly comprises a memory which stores the battery voltage Von of the rechargeable battery detected by the battery voltage detection means immediately before the charging current is switched off by the switching means, internal resistance determination means which obtains a value corresponding to the internal resistance R of the rechargeable battery, from the open battery voltage Voff of the rechargeable battery detected by the battery voltage detection means when the charging current is switched off by the switching means, and the battery voltage Von stored in the memory, and battery life determination means which determines the operation life of the rechargeable battery, in accordance with the value Z(int) corresponding to the early-stage internal resistance R of the rechargeable battery obtained by the internal resistance determination means and the value Z(now) corresponding the latest internal resistance R of the rechargeable battery obtained by the internal resistance determination means.

The internal resistance determination means preferably comprises timer means, and is configured to determine the value corresponding to the internal resistance R of the rechargeable battery, utilizing the open battery voltage Voff of the rechargeable battery obtained by the battery voltage detection means after a predetermined period has elapsed since the switching means switched off the charging current of the rechargeable battery.

Another embodiment of the rechargeable battery device of the present invention comprises battery voltage detection means which determines the terminal voltage of the rechargeable battery, current detection means which detects the charging current to the rechargeable battery, and switching means which switches on and off the charging current of the rechargeable battery continuously or intermittently, and particularly comprises a memory which stores the battery voltage Von of the rechargeable battery detected by the battery voltage detection means immediately before the charging current is switched off by the switching means, and the charging current Ion detected by the current detection means at the same timing, internal resistance determination means which obtains a value corresponding to the internal resistance R of the rechargeable battery, from the open battery voltage Voff of the rechargeable battery detected by the battery voltage detection means when the charging current is switched off by the switching means, the charging current Ioff detected by the current detection means at the same timing, and the battery voltage Von and charging current Ion stored in the memory, and battery life determination means which determines the operation life of the rechargeable battery in accordance with the value Z(int) corresponding to the early-stage internal resistance R of the rechargeable battery obtained by the internal resistance determination means and the value Z(now) corresponding to the latest internal resistance R of the rechargeable battery obtained by the internal resistance determination means.

The internal resistance determination means of this embodiment of the rechargeable battery device preferably comprises timer means, and is configured to determine the value corresponding to the internal resistance R of the rechargeable battery, utilizing the open battery voltage Voff of the rechargeable battery obtained by the battery voltage detection means after a predetermined period has elapsed since the charging current of the rechargeable battery was switched off by the switching means, and the charging current Ioff obtained by the current detection means.

It is preferable that means for prohibiting the calculation process of the internal resistance of the rechargeable battery by the internal resistance determination means when the current detection means detects a discharging current of the rechargeable battery be provided to prevent a wrong determination of the battery life.

If the rechargeable battery comprises a battery block in which multiple rechargeable battery cells are connected in series, the rechargeable battery device of the present invention particularly comprises voltage detection means which detects the terminal voltage of each group of a single or multiple rechargeable battery cells forming the battery block, fluctuation determination means which determines the fluctuation in the terminal voltages of the groups, unbalance detection means which generates an unbalance signal when the fluctuation in the group terminal voltages during or after the charging of the rechargeable battery exceeds a predetermined level, and battery life determination means which determines the operation life of the battery block, on the basis of the unbalance signal generated by the unbalance detection means.

More specifically, the rechargeable battery device of the present invention has been achieved by paying attention to the fact that the terminal voltages of the rechargeable battery cells vary if the performance of one of multiple rechargeable battery cells connected in series to form the battery block. The terminal voltages of individual groups of a single or multiple rechargeable battery cells are separately detected, and the operation life of the battery block is determined on the basis of the fluctuation of the terminal voltages during or after the charging of the battery block.

The unbalance detection means is preferably configured to determine the fluctuation of the terminal voltages of the group after the lapse of a predetermined period since the beginning of the charging of the rechargeable battery, after the charging of a predetermined amount, after the attainment of a predetermined charging voltage, or after the lapse of a predetermined period since the end of charging.

It is noted that the terminal voltages of the rechargeable battery cells are likely to vary in an early stage of charging even if the performance of the rechargeable battery cells is uniform. Accordingly, the fluctuation of the terminal voltages of the multiple rechargeable battery cells is determined in a period other than the early stage of charging.

In a preferred embodiment of the present invention, the unbalance detection means is configured to determine the fluctuation of the terminal voltages of the groups just once at a predetermined timing during or after charging, each time the battery block is charged. The life determination means is configured to determine the operation life of the battery block, on the basis of the number of times Nt or the number of times in a row Ns the unbalance detection means generates the unbalance signal.

The unbalance detection means may also be configured to determine the fluctuation of the terminal voltages of the group in multiple levels and to generate an unbalance signal according to the determined level. In this case, it is preferable that the life determination means is configured to determine the degree of the operation life of the battery block in accordance with the type of the unbalance signal.

DETAILED DESCRIPTION OF THE INVENTION

Preferable embodiments of the present invention will now be described with reference to the attached drawings, in which the rechargeable battery device used as a backup power source for a server of a network system is taken as an example.

Figure 1:
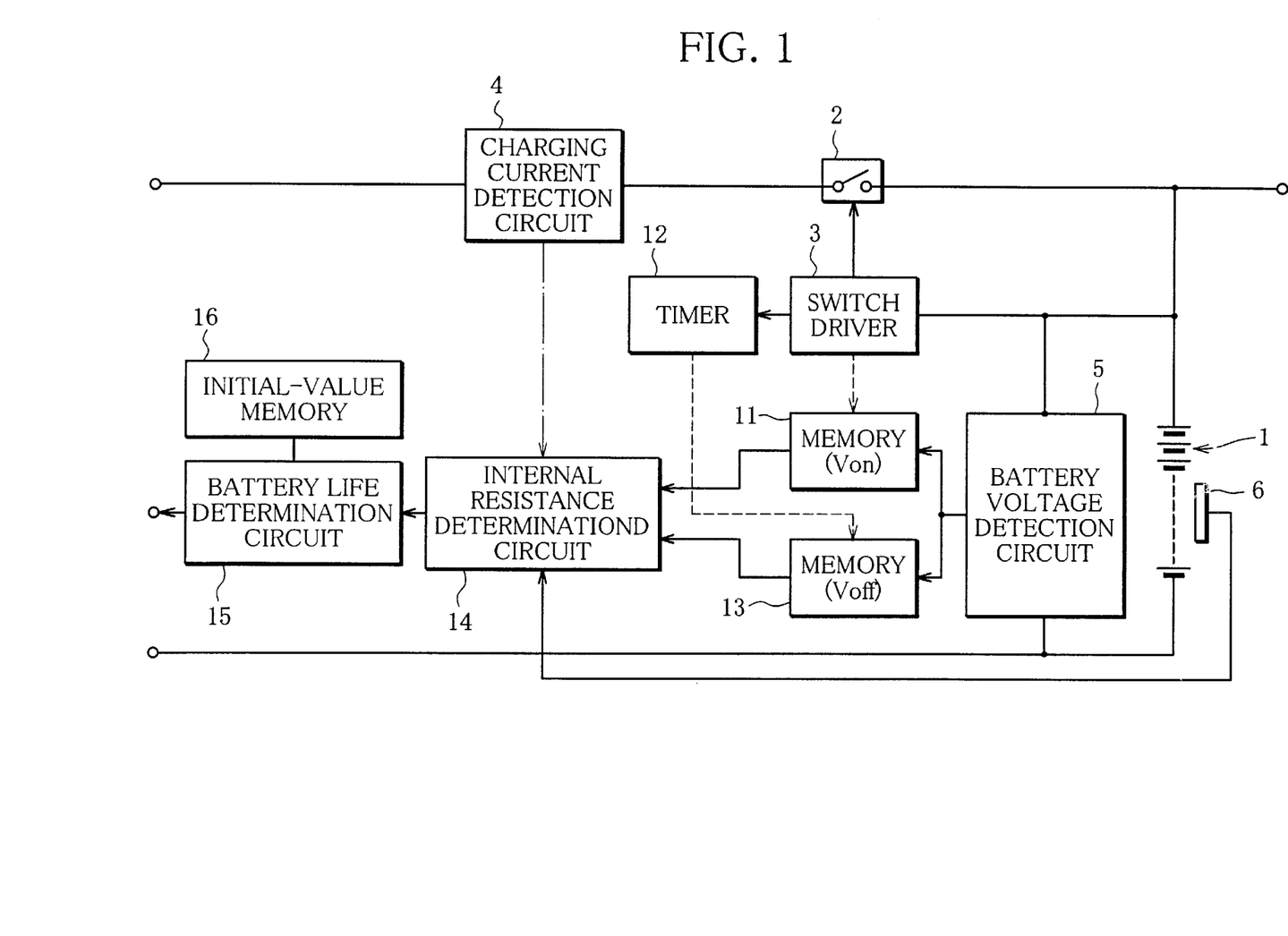
FIG. 1 is a schematic constitutional diagram of the rechargeable battery device of a first embodiment of the present invention.

FIG. 1 is a schematic constitutional diagram of the rechargeable battery device of a first embodiment. The reference numeral 1 denotes a rechargeable battery comprising a nickel hydride metal (Ni-MH) battery. The rechargeable battery 1 comprises multiple battery cells which are connected in series or parallel and have a certain terminal voltage (battery voltage) and a certain current-carrying capacity. The rechargeable battery 1 is connected and charged from the internal power supply of unillustrated external equipment (server) and is also disposed to discharge the charge to the external equipment.

Figure 2A:
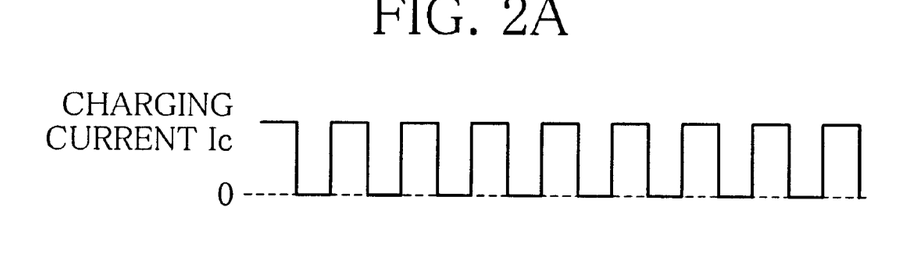
FIG. 2A is a view for showing the charging current Ic of the rechargeable battery switched on and off continuously.
Figure 2B:
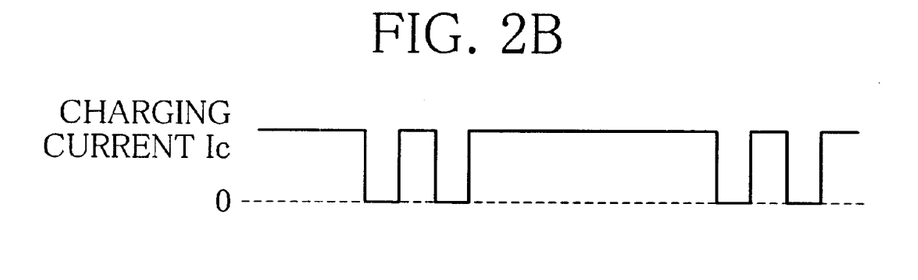
FIG. 2B is a view for showing the charging current Ic of the rechargeable battery switched on and off at intermittently.

In the charging path of the rechargeable battery 1, two switching elements 2 formed by FET or the like are provided in series. These switching elements 2 are driven to close or open by a switch driver 3. The switching elements 2 have a function of interrupting the charging path and stopping the charging when the rechargeable battery 1 is fully charged and have another function of switching on and off the charging current Ic continuously, as shown in FIG. 2A, or intermittently, as shown in FIG. 2B, during the charging of the rechargeable battery 1.

The switch driver 3 performs, for instance, a charge control function to keep track of the terminal voltage of the rechargeable battery 1 and to control charging accordingly and a function to open and close the switching elements 2 continuously or intermittently at a certain timing during the charging of the rechargeable battery 1, or to be more precise while the charging of the switching elements 2 is permitted. The charge control function is implemented through the adoption of the −ΔV detection method, which detects full charge, utilizing the fact that the terminal voltage gradually increases during charging, reaches its peak at full charge, then decreases. A method of controlling charging by detecting the temperature increase ratio during charging, the peak voltage detection method, and many other conventional charging control methods may also be used as necessary.

In the charging path of the rechargeable battery 1, a charging current detection circuit 4 for determining the charging current Ic is provided in series. The charging current Ic is a parameter for determining the battery performance of the rechargeable battery 1. A battery voltage detection circuit 5 for determining the terminal voltage V of the rechargeable battery 1 is disposed across both terminals of the rechargeable battery 1. This terminal voltage V is also a parameter for determining the battery performance of the rechargeable battery 1. The reference numeral 6 in the figure denotes a temperature sensor for monitoring the battery temperature T of the rechargeable battery 1. The temperature sensor 6 is stuck to or disposed otherwise on the metal case of the rechargeable battery 1.

The rechargeable battery device in this embodiment is essentially configured with the switching elements 2 for switching on and off the charging current Ic of the rechargeable battery 1, the charging current detection circuit 4 for detecting the charging current Ic, and the battery voltage detection circuit 5 for determining the terminal voltage V, as described above. The rechargeable battery device of the present invention configured as described above features a memory 11 provided to store the battery voltage Von of the rechargeable battery 1 obtained immediately before the charging current Ic is cut off by the switching elements 2, while the switching elements 2 are driven to close and open during the charging of the rechargeable battery 1. The memory 11 stores the battery voltage Von of the rechargeable battery 1 detected by the battery voltage detection circuit 5 immediately before the switching elements 2 are driven to open as controlled by the switch driver 3.

Figure 3:
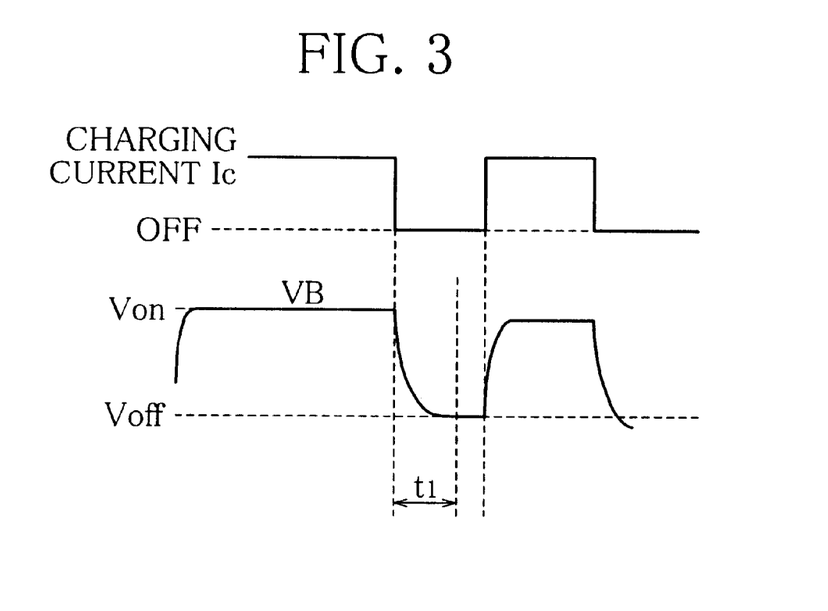
FIG. 3 shows variations in battery voltage resulting from the switching off of the charging current of the rechargeable battery, and the relationship between the battery voltage Von immediately before the switching off and the open battery voltage Voff in the off state.

The control output of the switch driver 3 is also supplied to a timer 12. This timer 12 drives a second memory 13 disposed in parallel with the memory 11, after a predetermined time t1 has elapsed since the switching elements 2 were turned off. The predetermined time t1 is specified within a range of 1 to 10 seconds, for instance, allowing a period for stabilizing the state of the rechargeable battery 1 after the charging current Ic is cut off. That is, the second memory 13 stores the battery voltage Voff of the rechargeable battery 1 detected by the battery voltage detection circuit 5 while the charging current Ic of the rechargeable battery 1 is being cut off by the switching elements 2. The second memory 13 holds the open battery voltage Voff of the rechargeable battery 1 when the charging current Ic is cut off during the charging of the rechargeable battery 1 as shown in FIG. 3.

An internal resistance determination circuit 14 takes the voltages Von and Voff stored respectively in the two memories 11 and 13. Then, the internal resistance determination circuit 14 determines a value Z corresponding to the internal resistance R of the rechargeable battery 1, from the battery voltage Von immediately before the charging current Ic of the rechargeable battery 1 is cut off and from the open battery voltage Voff while the charging current Ic is cut off, as given by $$Z = A(\text{Von} - \text{Voff})$$

where A is a factor of proportionality.

The value Z corresponding to the internal resistance R of the rechargeable battery 1 (equivalent of internal resistance) determined as described above is supplied to a battery life determination circuit 15 and is used to determine the battery life. The battery life determination circuit 15 comprises an initial-value memory 16, which stores the equivalent of internal resistance Z of the rechargeable battery 1 obtained while the rechargeable battery 1 was new (first put to use, for instance), as the initial value Z(int). The battery life determination circuit 15 then compares the latest equivalent of internal resistance Z(now) detected at a certain timing each time the rechargeable battery 1 is charged, with the initial value Z(int) stored in the initial-value memory 16. More specifically, the battery life determination circuit 15 obtains the difference between the latest equivalent of internal resistance Z(now) and its initial value Z(int), and judges that the operation life of the rechargeable battery 1 is ending when the latest equivalent of internal resistance Z(now) exceeds its initial value Z(int) by a certain amount.

In the operation life determination, the ratio of the latest equivalent of internal resistance Z(now) to its initial value Z(int) may be obtained, and it may be judged that the rechargeable battery 1 is dead when the latest equivalent of internal resistance Z(now) exceeds three times its initial value Z(int), for instance. The battery life determination threshold can be compensated for by the effects of the battery temperature T detected by the temperature sensor 6.

When the rechargeable battery 1 is judged accordingly as being dead, a message recommending the replacement of the rechargeable battery 1, such as "The battery needs immediate replacing" is displayed, in response to the output of the battery life determination circuit 15. At the same time, a battery exhaustion alarm is issued. The message to be displayed may be varied with the determined degree of battery life, such as "The battery is approaching the end of its operation life. Have a fresh battery for replacement."

To represent those output messages, a single or multiple indicator lamps may be provided and illuminated in some different ways. For instance, if multiple indicator lamps are provided, the number of indicator lamps to be illuminated may be determined according to the level of battery life. If a single indicator lamp is provided, the color of indication or the on-off intervals may be changed. The number of messages is not always two and may be three or more.

The rechargeable battery device configured as described above can accurately determine the battery performance of the rechargeable battery 1 and by extension its battery life, because the value Z corresponding to the internal resistance R of the rechargeable battery 1 is obtained while switching on and off the charging current Ic during the charging of the rechargeable battery 1. Further, because the initial equivalent of internal resistance Z(int) and the latest equivalent of internal resistance Z(now) of the rechargeable battery 1 are compared to determine the battery life, the reliability of determination can be sufficiently enhanced.

Because the values corresponding to the internal resistance R are not obtained when the rechargeable battery 1 is fully charged, those values corresponding to the internal resistance R can be accurately determined without effects of internal heat generated by the rechargeable battery 1 in the fully charged condition, so that the operation life of the rechargeable battery 1 can be determined easily and even accurately. Moreover, because the battery life can be determined while the charging current Ic of the rechargeable battery 1 is being switched on and off continuously or intermittently, the rechargeable battery device can be configured simply at a low cost.

Figure 4:
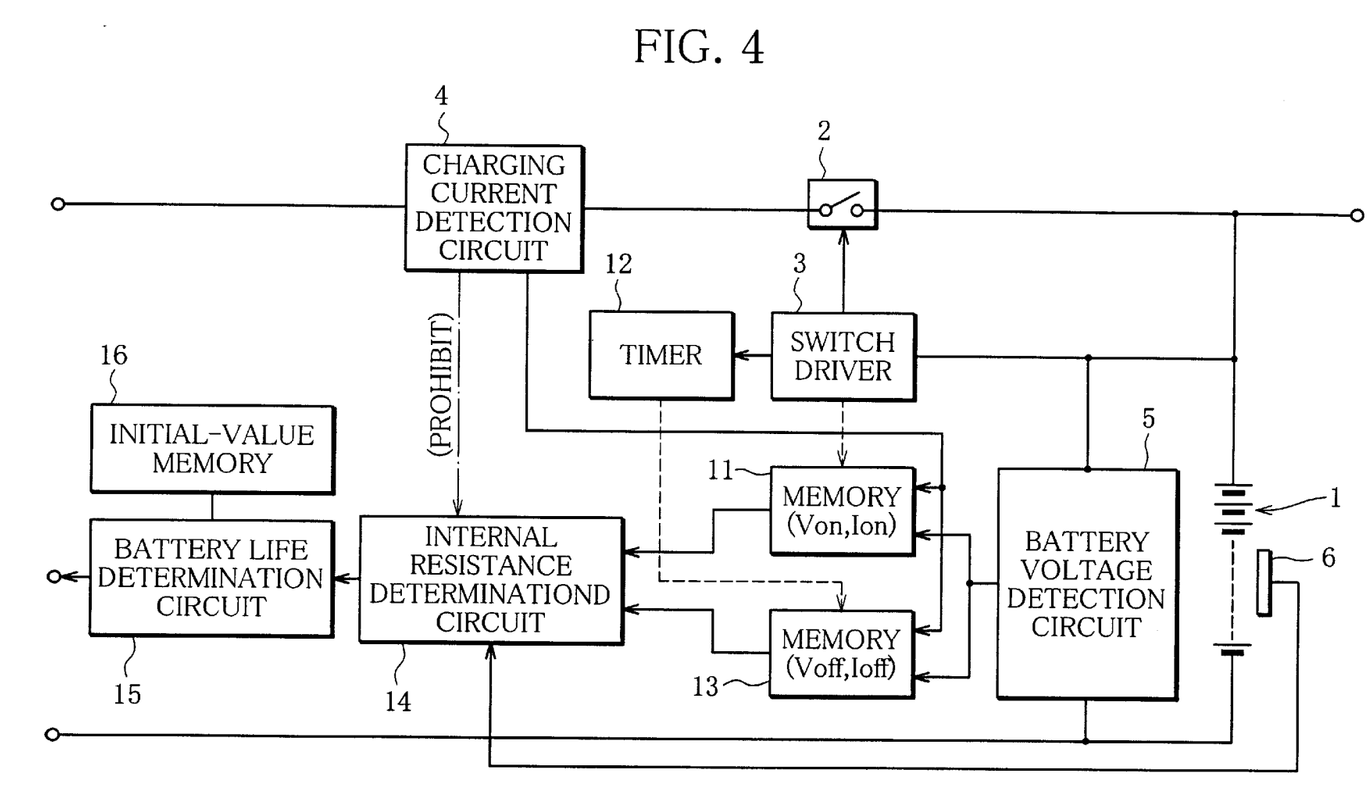
FIG. 4 is a schematic constitutional diagram of the rechargeable battery device of a second embodiment of the present invention.

In the first embodiment described above, the charging current of the rechargeable battery 1 is switched on and off during charging, and the value Z corresponding to the internal resistance R of the rechargeable battery 1 is determined on the basis of the battery voltage Von immediately before switching off and the open battery voltage Voff in the off state. The charging current Ic of the rechargeable battery 1 may also be detected at the detection timings. More specifically, the charging current Ion immediately before the charging current Ic is switched off by the switching elements 2 and the charging current (trickle current) Ioff after the charging current Ic is switched off may be detected by the charging current detection circuit 4, as shown in FIG. 4. Together with the battery voltages Von and Voff, the corresponding charging currents Ion and Ioff may be stored in the memories 11 and 13.

In the internal resistance determination circuit 14, the value Z corresponding to the internal resistance R of the rechargeable battery 1 (equivalent of internal resistance) may be determined as expressed below, for instance.

$$Z=B(Von-Voff)/(Ion-Ioff)$$

where B is a factor of proportionality.

If the currents Ion and Ioff flowing through the rechargeable battery 1 are detected as well as the battery voltages Von and Voff of the rechargeable battery 1 to determine the value Z corresponding to the internal resistance R, the battery performance and hence the battery life can be accurately determined, regardless of the charging pattern of the rechargeable battery 1.

If the battery performance is temperature-compensated in accordance with the battery temperature T detected by the temperature sensor 6, the determination accuracy can be improved further. The polarity of the current detected by the charging current detection circuit 4 may also be monitored to detect the discharging of the rechargeable battery 1. When discharging is detected, both the storage of the open battery voltage Voff in the second memory 13 and the operation of the internal resistance determination circuit 14 may be prohibited. With these prohibitions, the arithmetic operation of internal resistance based on wrong measurements and hence the inaccurate determination of battery performance (battery life) can be prevented, so that the reliability of battery life determination can be improved easily.

In the battery life determination, the battery voltages Von and Voff determined each time the charging current Ic of the rechargeable battery 1 is switched on or off may also be averaged out, and the value Z corresponding to the internal resistance R of the rechargeable battery 1 may be obtained from the mean value. In that case, it is preferable that greatly deviating values be excluded to reduce the variations in the determined battery voltages Von and Voff and consequently to improve the determination accuracy.

The internal resistance determination circuit 14 may also be configured to obtain the open battery voltage Voff from the battery voltage detection circuit 5, not through the second memory 13, and to perform the arithmetic operation to obtain the internal resistance in real time. The applications in which a nickel hydride metal battery is used as the rechargeable battery 1 have been described, but it is needless to say that applications in which nickel-cadmium, lithium-ion, and other rechargeable batteries also are possible likewise. As a matter of course, the detection of the battery voltages Von and Voff described above may be controlled by software.

In the present invention, the charging current is switched on and off during the charging of the rechargeable battery, and the battery life is determined on the basis of the battery voltage Von immediately before the switching off and the open battery voltage Voff in the off state, as indicated by the embodiments described above. Accordingly, the present invention enables accurate battery life determination under identical determination conditions, while the battery condition is stable before the rechargeable battery is fully charged. Further, the rechargeable battery does not have to be discharged at a constant current, and the battery state is kept constant during the determination, so that the capabilities of determining the battery life easily and accurately, streamlined and low-cost configuration of the whole rechargeable battery device, and other practically great effects are produced.

If the rechargeable battery comprises a battery block in which a plurality of rechargeable battery cells are connected in series, the battery life can be determined as described below. If the performance of one of the multiple rechargeable battery cells connected in series to comprise the battery block has deteriorated, the terminal voltages of the rechargeable battery cells vary. A rechargeable battery device equipped with a battery life determination function utilizing the fluctuation of the terminal voltages can be implemented as described below.

The rechargeable battery device comprises a battery block 21 in which a plurality of rechargeable battery cells B1 to Bn such as a nickel hydride metal (Ni-MH) battery are connected in series, as shown in the schematic diagram of FIG. 4. In the following description, the battery block 21 configured by six rechargeable battery cells B1 to B6 connected in series is taken as an example.

Figure 5:
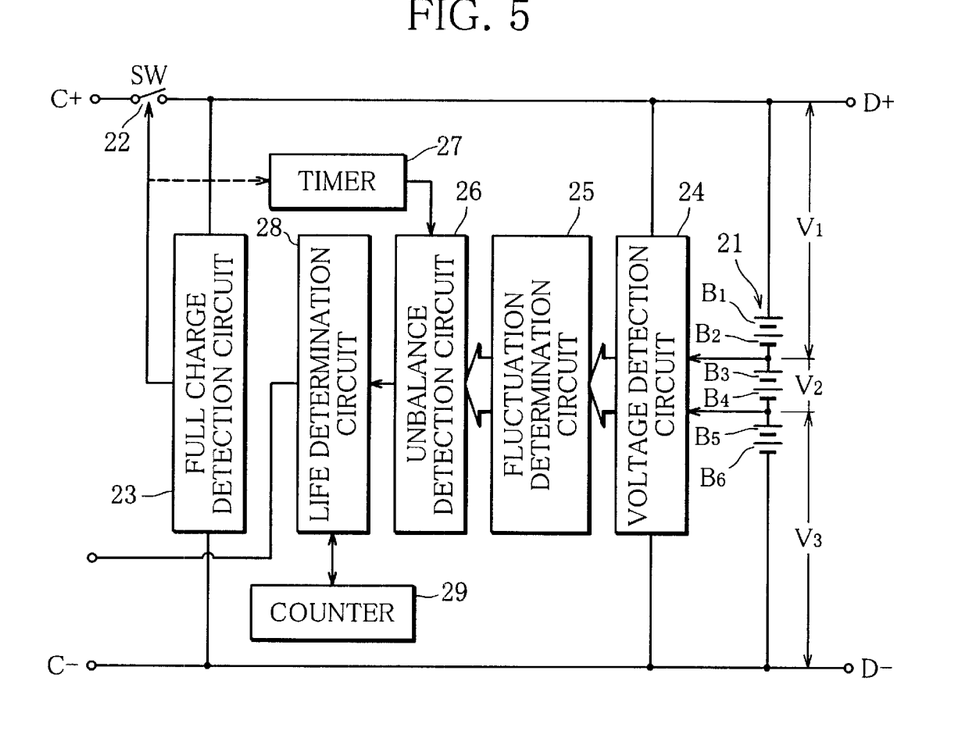
FIG. 5 is a schematic constitutional diagram illustrating the important part of the rechargeable battery device of another embodiment of the present invention.

The battery block (rechargeable battery) 21 is connected to a pair of charging terminals C+ and C− and a pair of discharging terminals D+ and D−, through the switching elements 22 which are formed by FET or the like and are provided in series. The battery block (rechargeable battery) 21 is charged via switching elements 22. The switching elements 22 are driven to open and close by a full charge detection circuit 23, and have a function to stop the charging of the battery block 21 (rechargeable battery cells B1 to B6) by interrupting the charging path when the battery block 21 is fully charged.

The full charge detection circuit 23 is implemented through the adoption of the −ΔV detection method, which detects the full charge status of the battery block 21, for instance, by utilizing the fact that the terminal voltage Vbat of the rechargeable battery (battery cells) gradually increases during charging, reaches its peak at full charge, then decreases. The full charge detection circuit 23 may also be configured by utilizing a method of controlling charging by detecting the temperature increase ratio during charging, the peak voltage detection method, and many other conventional charging control methods as necessary.

The multiple (six) rechargeable battery cells B1 to B6 connected in series to comprise the battery block 21 are sequentially separated into three groups of two cells each, and the rechargeable battery device is equipped with a voltage detection circuit (voltage detection means) 24, which determines the terminal voltages of the groups separately. That is, the battery block 21 is split into a first group of rechargeable battery cells B1 and B2, a second group of rechargeable battery cells B3 and B4, and a third group of rechargeable battery cells B5 and B6. The voltage detection circuit 24 is disposed to detect the group terminal voltages V1, V2, and V3 separately.

A fluctuation determination circuit 25 is supplied with the group terminal voltages V1, V2, and V3 separately determined by the voltage detection circuit 24. The fluctuation determination circuit 25 determines the fluctuation of the terminal voltages V1, V2, and V3, more specifically voltage differences $\Delta V1-2$ (=|V1−V2|), $\Delta V2-3$ (=|V2−V3|), and $\Delta V3-1$ (=|V3−V1|).

The fluctuation (voltage differences) of the group terminal voltages V1, V2, and V3 determined by the fluctuation determination circuit 25 is supplied to an unbalance detection circuit (unbalance detection means) 26, which operates at the timing controlled by a timer 27, as described later, and judges whether the group terminal voltages V1, V2, and V3 get out of balance. The unbalance detection circuit 26 judges that the group charging voltages are out of balance and generates an unbalance signal, when a voltage difference among terminal voltages V1, V2, and V3 is 0.5 V or greater, for instance.

The unbalance determination is made by comparing the voltage differences $\Delta V1-2$ (=|V1−V2|), $\Delta V2-3$ (=|V2−V3|), and $\Delta V3-1$ (=|V3−V1|) respectively with a predetermined determination threshold [0.5 V]. If at least one of the voltage differences $\Delta V1-2$, $\Delta V2-3$, and $\Delta V3-1$ exceeds the determination threshold [0.5 V], it is judged that the unbalance state has occurred.

The unbalance determination is made at a timing specified by the timer 27, more specifically after a lapse of a predetermined period since the beginning of charging of the battery block 21. The timer 27 measures how much time has elapsed since charging began with the closure of the switching elements 22, and drives the unbalance detection circuit 26 when a predetermined period has elapsed. This period is preset within the range from several minutes to about one hour, depending on the charging conditions and charging state of the battery block 21. Because the timer 27 specifies (controls) the timing of determination as described above, the unbalance determination is performed in a period excluding the period in which the battery voltage is unstable in early stage of charging. In other words, because the terminal voltages of the multiple rechargeable battery cells are likely to vary in early stage of charging even if the performance of those rechargeable battery cells is uniform, the unbalance detection circuit 26 determines the fluctuation of the terminal voltages of the rechargeable battery cells just in the period excluding early stage of charging of the rechargeable battery cells.

The unbalance determination by the unbalance detection circuit 26 may also be made after the battery block 21 is charged by a certain amount or after the terminal voltage Vbat of the battery block 21 reaches a certain charging voltage. Alternatively, the timer 27 may measure the lapse of time since the switching elements 22 were opened to stop charging when full charge was detected, and the unbalance detection described above may be made after the lapse of a predetermined period since the end of charging. It is essential that the unbalance detection circuit 26 determines the fluctuation of the terminal voltages of multiple battery groups (rechargeable battery) just once at an appropriate timing specified as described above for a single charging session, when the battery block 21 is or was charged.

A battery life determination circuit 28 determines the operation life of the battery block 21 on the basis of the unbalance signal generated by the unbalance detection circuit 26. The battery life detection circuit 28 basically judges that the performance of the rechargeable battery cells B1 to B6 comprising the battery block 21 greatly varies (the battery performance has deteriorated) and that the battery life is ending, when the unbalance signal is generated.

It cannot be denied that the performance of the multiple rechargeable battery cells B1 to B6 comprising the battery block 21 gradually deteriorates with use after repeated charging and discharging. In addition, the degree of performance deterioration varies from cell to cell, among the multiple rechargeable battery cells B1 to B6. If the battery performance of the multiple rechargeable battery cells B1 to B6 deteriorates after a long period of use, the charging voltages are likely to vary even when the rechargeable battery cells B1 to B6 are simultaneously charged.

Figure 6:
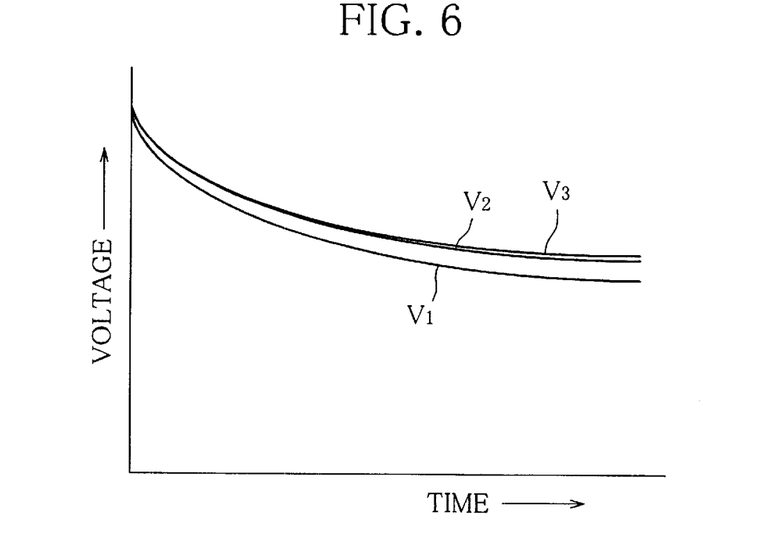
FIG. 6 shows the variation characteristics of the terminal voltage of rechargeable battery after the end of charging.

Even if each of the rechargeable battery cells B1 to B6 is fully charged, the terminal voltage gradually decreases, as shown in FIG. 6, when the charging current becomes zero at the completion of charging or while just minute charging currents are flowing. The degree of decrease in terminal voltage also depends on the battery performance. If the battery performance has deteriorated, the battery voltages V1, V2, and V3 after a lapse of a predetermined period vary, as shown in FIG. 6.

The unbalance detection circuit 26 detects the fluctuation of the battery voltages resulting from the deteriorated performance of the rechargeable battery cells B1 to B6, from the differences among the terminal voltages V1, V2, and V3 of the multiple battery groups formed as described above, and generates the unbalance signal when the fluctuation is large. On the basis of the unbalance signal, the battery life determination circuit 28 detects the fluctuation of the battery voltages of the rechargeable battery cells B1 to B6 and the deterioration of the battery performance, and determines the battery life accordingly.

The number of times Nt the unbalance signal is generated may be counted by a counter 29, so that it is judged that the operation life of the battery block 21 (rechargeable battery cells B1 to B6) is ending when the generation count Nt reaches a predetermined level. Or, the number of times in a row Ns the unbalance signal is generated may be counted by checking the presence or absence of the unbalance signal when the unbalance determination is made by the unbalance detection circuit 26, so that it is judged that the operation life of the battery block 21 (rechargeable battery cells B1 to B6) is ending when the consecutive generation count Ns reaches a predetermined level.

When it is determined that the operation life of the battery block 21 (rechargeable battery cells B1 to B6) has been ending, the battery life determination circuit 28 outputs an alarm signal L indicating battery exhaustion or a message saying "Replacing the battery is recommended," for instance. The remaining battery life may also be indicated in multiple levels, depending on the number of times Nt or the number of times in a row Ns the unbalance signal is generated. Messages depending on the level of remaining battery operation life such as "The battery will need replacing soon"

"The battery needs immediate replacing" may also be displayed. As a matter of course, the remaining battery operation life may also be displayed in multiple levels by disposing a single or multiple indicators (indication elements) and providing different patterns of indications, more specifically, by changing the color of indication or on-off intervals of the single or multiple indicators (indication elements).

Figure 7:
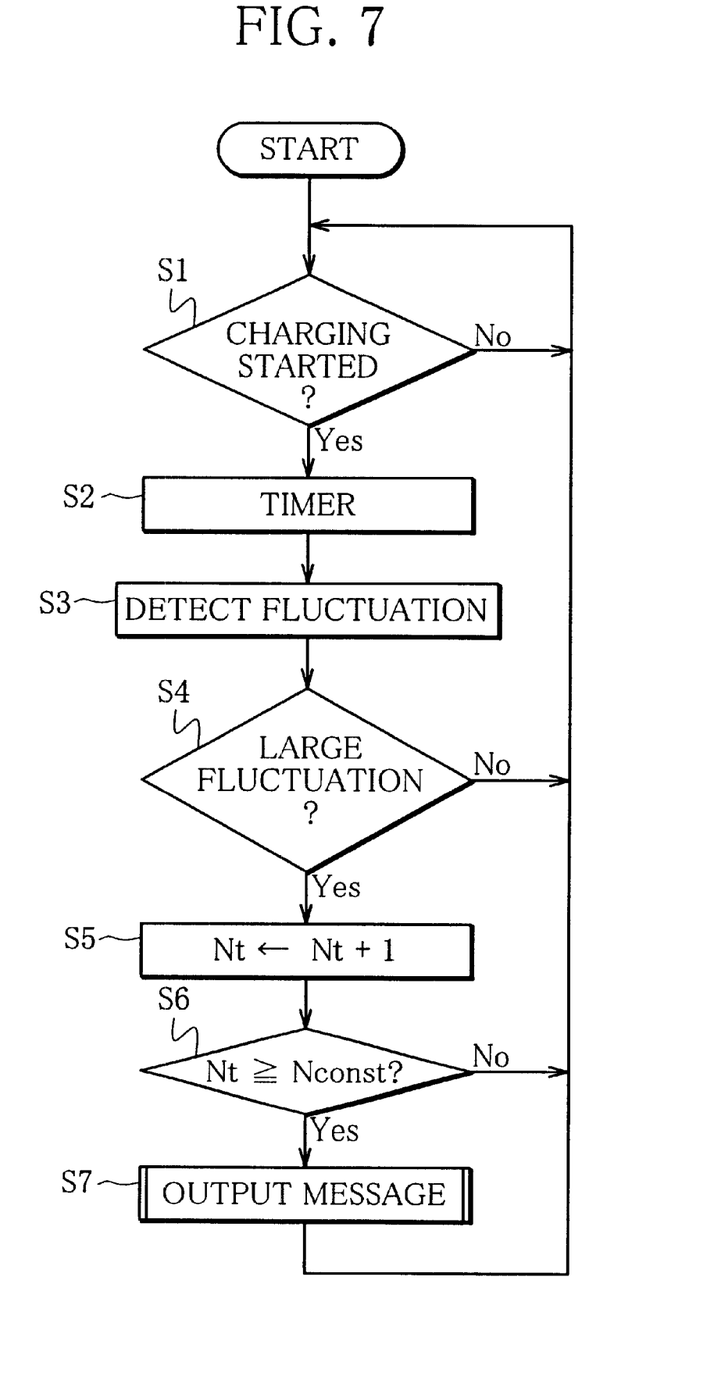
FIG. 7 shows a procedure for determining the battery life through monitoring the number of times Nt the unbalance signal is generated.

Specifically, as shown in FIG. 7, an example of the processing flow, after the beginning of charging of the battery block 21 is detected [step S1], the timer 27 starts measuring the lapse of a predetermined time [step S2]. When the predetermined period has elapsed from the beginning of charging, the fluctuation of the battery voltages is determined [step S3], and it is judged whether the fluctuation is large [step S4]. If the fluctuation is large, the counter 29 counting the number of times the unbalance signal is generated is incremented [step S5]. When the generation count Nt reaches a preset count Nconst, it is judged that the battery block 21 (rechargeable battery cells B1 to B6) is reaching the end of its operation life [step S6], and the message indicating the fact is output [step S7].

Figure 8:
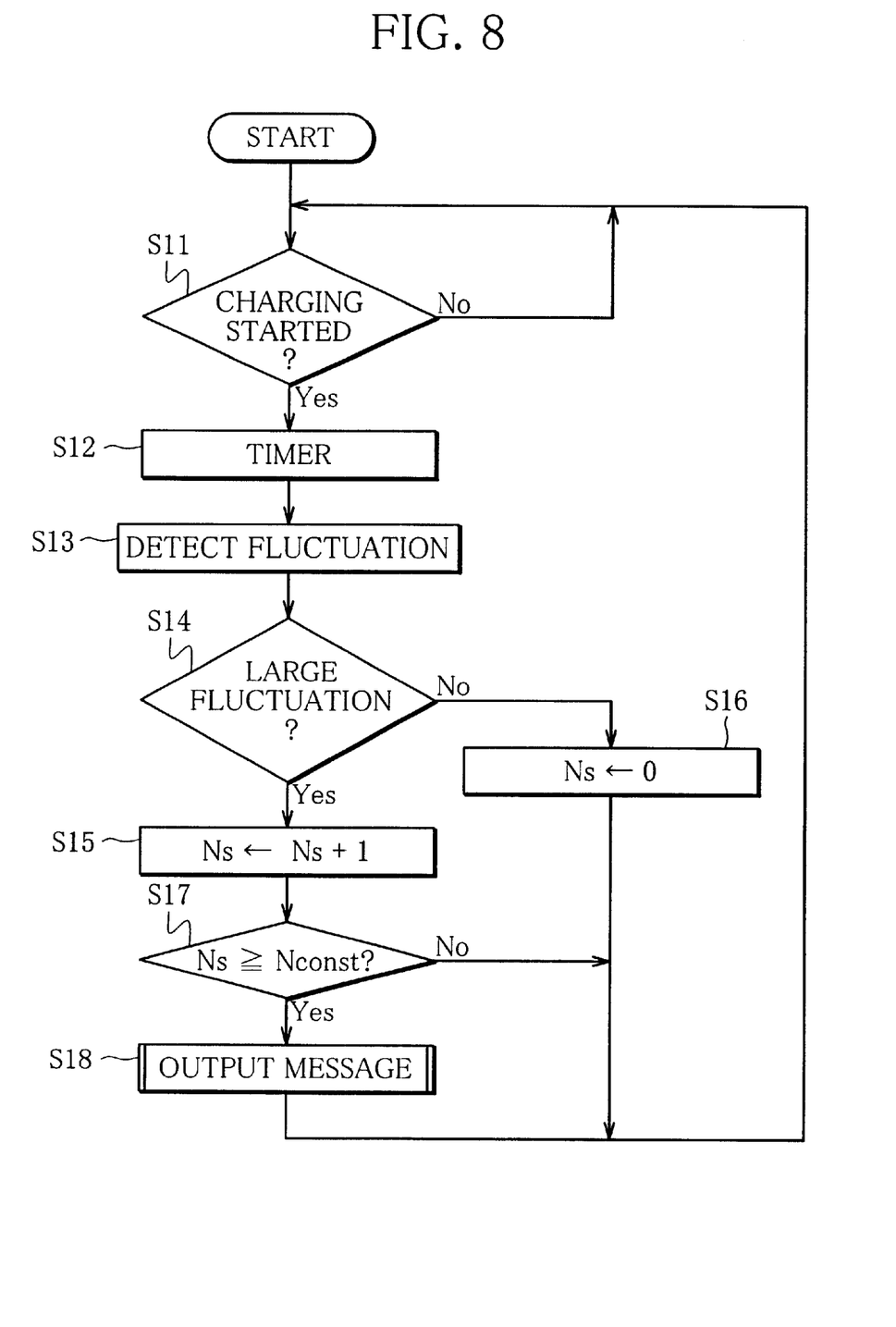
FIG. 8 shows a procedure for determining the battery life through monitoring the number of times in a row Ns the unbalance signal is generated.

As shown in FIG. 8, another example of the processing flow, after the beginning of charging of the battery block 21 is detected [step S11], the timer 27 starts measuring the lapse of a predetermined time [step S12]. When the predetermined period has elapsed from the beginning of charging, the fluctuation of the battery voltages is detected [step S13], and it is judged whether the fluctuation is large [step S14]. If the fluctuation is large, the counter 29 counting the number of times Ns the unbalance signal is generated is incremented [step S15]. If the fluctuation is small, the counter 29 is reset [step S16]. In that way, the counter 29 counts the number of times in a row Ns the unbalance signal is generated.

When the counter 29 indicates that the number of times in a row Ns the unbalance signal is generated has reached a preset count Nconst, it is judged that the battery block 21 (rechargeable battery cells B1 to B6) is reaching the end of its operation life [step S17], and the message indicating the fact is output [step S18].

By monitoring the number of times Nt or the number of times in a row Ns the unbalance signal is generated, the operation life of the rechargeable battery can be determined easily and accurately. That is, the battery operation life (deterioration of battery performance) can be easily and accurately determined from the degree of fluctuation of the terminal voltages during the charging of the multiple rechargeable battery cells B1 to B6 forming the battery block 21 or at a certain time after the completion of charging, and can be displayed accordingly. Because the degree of fluctuation is determined just in a period excluding the period in which the terminal voltages of the rechargeable battery cells B1 to B6 are not stable, in early stage of charging, the life determination can be made with high reliability. In addition, because the battery life can be determined without discharging the rechargeable battery, useless consumption of the charged power of the rechargeable battery can be avoided.

Figure 9:
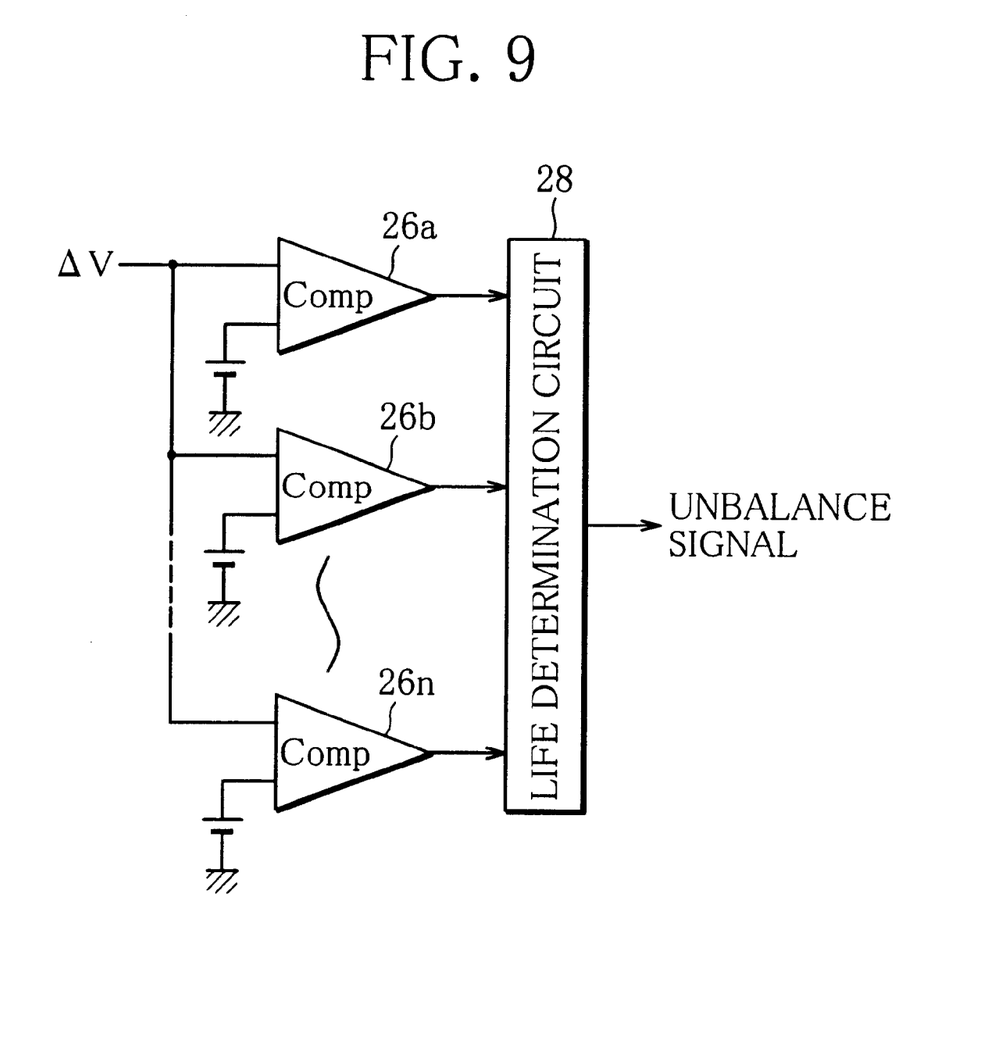
FIG. 9 shows an example of configuration of the unbalance detection circuit for detecting the unbalance state in multiple levels.

In the unbalance detection circuit 26, multiple comparators 26a to 26n disposed in parallel, as shown in FIG. 9, may also compare the voltage differences $\Delta V1-2$ (=|V1-V2|), $\Delta V2-3$ (=|V2-V3|), and $\Delta V3-1$ (=|V3-V1|) respectively with predetermined determination thresholds for multiple level, so that the unbalance state is determined in multiple levels. For instance, the voltage differences $\Delta V1-2$, $\Delta V2-3$, and $\Delta V3-1$ may be respectively compared with both a first determination threshold [0.3 V] and a second determination threshold [0.5 V], so that an unbalance signal depending on the determination threshold is generated.

The battery life determination circuit 28 may also output a message depending on the type of the unbalance signal given by the unbalance detection circuit 26 (comparators 26a to 26n). More specifically, the battery life determination circuit 28 can display the operation life of the battery in multiple levels by outputting a message saying "The battery will need replacing soon" when the unbalance signal based on the determination threshold of 0.3 V is output and a message saying "The battery needs immediate replacing" when the unbalance signal based on the determination threshold of 0.5 V is output. If the determination is made also in accordance with the number of times Nt or the number of times in a row Ns the unbalance signal is generated, as described above, the battery operation life can be determined with a higher accuracy.

The present invention is not limited to the embodiments described above. For instance, the number of rechargeable battery cells forming the battery block 21 can be any number as specified. The rechargeable battery may not always be a nickel hydride metal (Ni-MH) battery and may also be a lithium-ion, nickel-cadmium, or any other battery. If seven rechargeable battery cells are connected in series, those rechargeable battery cells may be separated into groups of two cells, two cells, and three cells, and the group terminal voltages can be compared in terms of the voltage of a single rechargeable battery. Of course, the terminal voltage of each rechargeable battery cell may also be detected to determine the fluctuation.

The fluctuation of the terminal voltages may be determined by obtaining the difference between the maximum and minimum values or by obtaining the difference between each terminal voltage and the mean value. The unbalance signal generation conditions may also be determined according to the battery specifications. Further, the threshold used with the number of times Nt or the number of times in a row Ns the unbalance signal is generated may be specified in accordance with the unbalance signal generation conditions and the performance of the rechargeable battery. It is also preferable that the life determination function be disabled while the battery block is discharging. The invention can be implemented with a variety of modifications not departing from the spirit and scope of the invention.

The embodiments described above show that the operation life of the battery block comprising a plurality of rechargeable battery cells connected in series can be easily and accurately determined by checking the terminal voltage of each rechargeable battery cell. Because the battery operation life is judged by determining the degree of fluctuation of the terminal voltages of the rechargeable battery in a period excluding early stage of charging of the battery block, the accuracy of battery life determination can be sufficiently improved and many other practically great effects are produced.

What is claimed is:

1. A rechargeable battery device, comprising:
   battery voltage detection means which determines the terminal voltage of a rechargeable battery,
   switching means which switches on and off the charging current of said rechargeable battery continuously or intermittently,
   a memory which stores the battery voltage Von of said rechargeable battery detected by said battery voltage detection means immediately before said charging current is switched off by said switching means,
   internal resistance determination means which determines a value corresponding to the internal resistance R of said rechargeable battery, from the open battery voltage Voff of said rechargeable battery detected by said battery voltage detection means when said charging current is switched off by said switching means and from the battery voltage Von stored in said memory, and battery life determination means which determines the operation life of said rechargeable battery, from the value Z(int) corresponding to the early-stage internal resistance R of said rechargeable battery obtained by said internal resistance determination means when said rechargeable battery was first put to use and value Z(now) corresponding to the latest internal resistance R obtained by said internal resistance determination means.

2. The rechargeable battery device according to claim 1, wherein said internal resistance determination means comprises timer means, and determines a value corresponding to the internal resistance R of said rechargeable battery, utilizing the open battery voltage Voff of said rechargeable battery detected by said battery voltage detection means when a predetermined period has elapsed sillice said switching means switched off the charging current of the rechargeable battery.

3. A rechargeable battery device comprising:

battery voltage detection means which determines the terminal voltage of a rechargeable battery, current detection means which detects the charging current to said rechargeable battery, switching means which switches on and off the charging current of said rechargeable battery continuously or intermittently, a memory which stores the battery voltage Von of said rechargeable battery determined by said battery voltage detection means immediately before said charging current is switched off by said switching means, together with the charging current Ion detected by said current detection means at the same timing, internal resistance determination means which determines a value corresponding to the internal resistance R of said rechargeable battery, from the open battery voltage Voff of said rechargeable battery detected by said battery voltage detection means when said charging current is switched off by said switching means, from the charging current Joff detected by said current detection means at the same timing, and from the battery voltage Von and the charging current Ion stored in said memory, and battery life determination means which determines the operation life of said rechargeable battery, from the value Z(int) corresponding to the early-stage internal resistance R of said rechargeable battery obtained by said internal resistance determination means when said rechargeable battery was first put to use and from the value Z(now) corresponding to the latest internal resistance R of said rechargeable battery obtained by said internal resistance determination means.

4. The rechargeable battery device according to claim 3, wherein said internal resistance determination means comprises timer means, and determines a value corresponding to the internal resistance R of said rechargeable battery, utilizing the open battery voltage Voff of said rechargeable battery detected by said battery voltage detection means when a predetermined period has elapsed since said switching means switched off the charging current of the rechargeable battery and the charging current Ioff detected by said current detection means.

5. The rechargeable battery device according to claim 3, further comprising means for prohibiting said internal resistance determination means from conducting a calculation process of the internal resistance of said rechargeable battery when said current detection means detects a discharging current of said rechargeable battery.

6. The rechargeable battery device according to claims 1 to 5, wherein said rechargeable battery comprises a nickel metal hydride battery.

7. A rechargeable battery device, comprising:

voltage detection means which detects the terminal voltage of each group of a single or multiple rechargeable battery cells in a battery block, wherein a plurality of rechargeable battery cells are connected in series, fluctuation determination means which determines the fluctuation of the terminal voltages of said groups, unbalance detection means which generates an unbalance signal when the fluctuation of said group terminal voltages during or after the charging of said rechargeable battery exceeds a predetermined level, and battery life determination means which determines the operation life of said battery block on the basis of the unbalance signal.

8. The rechargeable battery device according to claim 7, wherein said unbalance detection means determines the fluctuation of the terminal voltages of said groups at any one timing of after the lapse a predetermined period since the beginning of charging of said rechargeable battery block, after charging of the rechargeable battery block by a predetermined amount, after the attainment of a predetermined charging voltage by the terminal voltage of the rechargeable battery block, and after the lapse of a predetermined period since the end of charging of the rechargeable battery block.

9. The rechargeable battery device according to claim 7, wherein said unbalance detection means determines the fluctuation of the terminal voltages of said groups just once at a predetermined timing during or after the charging each time said battery block is charged, and said life determination means determines the operation life of said battery block, on the basis of the number of times the number of time Nt or the number of times in a row Ns the unbalance signal is generated by said unbalance detection means.

10. The rechargeable battery device according to claim 7, wherein said unbalance detection means determines the fluctuation of the terminal voltages of said groups in multiple levels, and generates an unbalance signal corresponding to the determination level.

11. The rechargeable battery device according to claims 7 to 10, wherein said rechargeable battery cell comprises a nickel metal hydride battery.

* * * * *